United States Patent
Reeves et al.

(10) Patent No.: US 10,735,949 B1
(45) Date of Patent: Aug. 4, 2020

(54) SYSTEMS AND METHODS FOR UPDATING PREFERRED NODES LISTS FOR WIRELESS DEVICES IN A WIRELESS NETWORK

(71) Applicant: Sprint Spectrum LP, Overland Park, KS (US)

(72) Inventors: Raymond Emilio Reeves, Orlando, FL (US); Dwight Inman, Traverlers Rest, SC (US)

(73) Assignee: Sprint Spectrum L.P., Overland Park, KS (US)

( * ) Notice: Subject to any disclaimer, the term of this patent is extended or adjusted under 35 U.S.C. 154(b) by 18 days.

(21) Appl. No.: 15/972,493

(22) Filed: May 7, 2018

(51) Int. Cl.
*H04W 8/24* (2009.01)
*H04W 92/04* (2009.01)
*H04W 84/04* (2009.01)

(52) U.S. Cl.
CPC .......... *H04W 8/245* (2013.01); *H04W 84/045* (2013.01); *H04W 92/045* (2013.01)

(58) Field of Classification Search
CPC ..... H04W 24/08; H04W 24/02; H04W 84/12; H04W 24/10; H04W 28/18; H04W 72/0453; H04W 72/085; H04W 24/04; H04W 36/0022; H04W 36/30; H04W 88/02; H04W 88/08; H04W 16/32; H04W 28/0236; H04W 28/0268; H04W 36/0011; H04W 36/0061; H04W 36/14; H04W 36/18; H04W 36/22; H04W 48/20; H04W 72/02; H04W 28/0284; H04W 28/08; H04W 36/00; H04W 36/0005; H04W 36/0016; H04W 36/08; H04W 36/16; H04W 36/20; H04W 36/24; H04W 36/36; H04W 36/385; H04W 40/12; H04W 52/0212; H04W 52/265; H04W 84/005; H04L 43/16; H04L 43/08; H04L 5/006; H04L 45/02
See application file for complete search history.

(56) References Cited

U.S. PATENT DOCUMENTS

| | | | |
|---|---|---|---|
| 8,897,264 B2 | 11/2014 | Samdanis | |
| 8,923,871 B2 | 12/2014 | Aminaka et al. | |
| 9,603,083 B2 | 3/2017 | Yang et al. | |
| 2011/0151877 A1* | 6/2011 | Tafreshi | H04W 36/18 455/442 |
| 2011/0223887 A1* | 9/2011 | Rune | H04L 63/101 455/411 |

(Continued)

*Primary Examiner* — Christopher M Brandt
*Assistant Examiner* — Jing Gao

(57) ABSTRACT

A system for updating a preferred nodes list for a wireless device in a wireless network includes a server in communication with a plurality of nodes each configured to deploy a radio air interface to provide wireless services to wireless devices. The server includes a processor configured to instruct, in response to a trigger, a first node to send a message to a wireless device connected to the first node. The message instructs the wireless device to contact the server for an updated preferred nodes list. The processor receives a request for the updated preferred nodes list from the wireless device, and provides the updated preferred nodes list to the wireless device. The updated preferred nodes list enables the wireless device to change from connecting to the first node included in the preferred nodes list to connecting to a second node included in the updated preferred nodes list.

20 Claims, 7 Drawing Sheets

(56) References Cited

U.S. PATENT DOCUMENTS

| | | | |
|---|---|---|---|
| 2013/0208653 A1* | 8/2013 | Morioka | H04B 7/155 370/315 |
| 2013/0215820 A1 | 8/2013 | Redana et al. | |
| 2014/0301371 A1* | 10/2014 | Maeda | H04W 76/10 370/331 |
| 2014/0349647 A1* | 11/2014 | Chen | H04W 36/30 455/436 |
| 2015/0256993 A1* | 9/2015 | Bellamkonda | H04W 8/12 455/433 |
| 2017/0055186 A1* | 2/2017 | Donepudi | H04W 4/029 |
| 2017/0339722 A1* | 11/2017 | Jiao | H04W 68/005 |

* cited by examiner

SYSTEMS AND METHODS FOR UPDATING PREFERRED NODES LISTS FOR WIRELESS DEVICES IN A WIRELESS NETWORK

TECHNICAL BACKGROUND

A wireless network, such as a cellular network, can include one or more access nodes each serving a number of end-user wireless devices or user equipment (UE) in a geographical area covered by the radio frequency transmissions of the access nodes. In some implementations, a wireless network may also include one or more relay nodes connected to an access node and configured to provide relay services to one or more end-user wireless devices that are indirectly connected to the access node through the relay nodes. Each of the relay nodes and end-user wireless devices may be associated with a preferred nodes list (e.g., a preferred donor cell list (or PDCL)), such that each of the relay nodes and end-user wireless devices may only connect to one of the nodes included in the preferred nodes list. In a conventional wireless network, the preferred nodes list is manually created and/or updated by an operator or user of a control server, such as a Universal Seamless Handoff Architecture (USHA) server. Manual updating is time consuming and inefficient, especially when there are a large number of relay nodes in the wireless network. Therefore, there is a need for systems and methods that are capable of automatically updating preferred nodes lists for wireless devices in a wireless network.

OVERVIEW

Exemplary embodiments described herein include systems, methods, and processing nodes for updating a preferred nodes list for a wireless device in a wireless network. An exemplary system described herein for updating a preferred nodes list for a wireless device in a wireless network includes a server in communication with a plurality of nodes each configured to deploy a radio air interface to provide wireless services to a plurality of wireless devices. The server includes a processor configured to instruct, in response to a trigger, a first node to send a message to a wireless device connected to the first node. The message instructs the wireless device to contact the server for an updated preferred nodes list. The processor is also configured to receive a request for the updated preferred nodes list from the wireless device. The processor is further configured to provide the updated preferred nodes list to the wireless device. The updated preferred nodes list enables the wireless device to change from connecting to the first node included in the preferred nodes list to connecting to a second node included in the updated preferred nodes list.

An exemplary method described herein for updating a preferred nodes list for a wireless device in a wireless network includes instructing, by a processor of a server in response to a trigger, a first node to send a message to a wireless device connected to the first node. The message instructs the wireless device to contact the server for an updated preferred nodes list. The method also includes receiving, by the processor, a request for the updated preferred nodes list from the wireless device. The method further includes providing, by the processor, the updated preferred nodes list to the wireless device. The updated preferred nodes list enables the wireless device to change from connecting to the first node included in the preferred nodes list to connecting to a second node included in the updated preferred nodes list.

An exemplary processing node is described herein for updating a preferred nodes list for a wireless device in a wireless network. The processing node is configured to perform operations including instructing, by a processor of the processing node in response to a trigger, a first node to send a message to a wireless device connected to the first node. The message instructs the wireless device to contact the processing node for an updated preferred nodes list. The operations also include receiving, by the processor, a request for the updated preferred nodes list from the wireless device. The operations further include providing, by the processor, the updated preferred nodes list to the wireless device. The updated preferred nodes list enables the wireless device to change from connecting to the first node included in the preferred nodes list to connecting to a second node included in the updated preferred nodes list.

DETAILED DESCRIPTION

Figure 1:
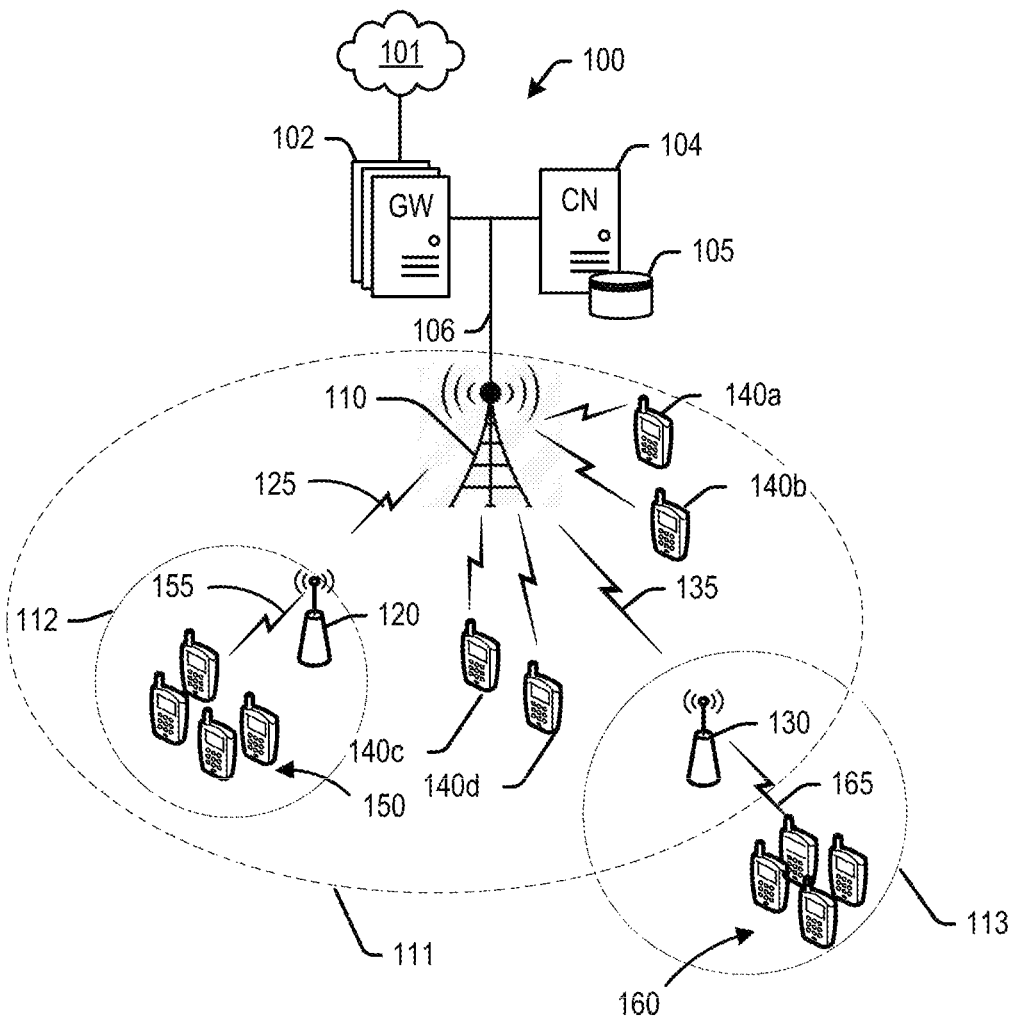
FIG. 1 depicts an exemplary system for wireless communication, in accordance with the disclosed embodiments.

Exemplary embodiments described herein include systems, methods, and processing nodes for automatically updating a preferred nodes list (e.g., a preferred donor cell list or PDCL) for a wireless device in a wireless network. In a wireless network, a plurality of wireless devices (such as end-user wireless devices and relay nodes) may be wirelessly connected to one or more access node, such as an eNodeB, a base station, etc. Under certain conditions, it may be desirable to re-allocate communication resources or re-configure the network connections, such that a wireless device (e.g., an end-user wireless device or a relay node) may switch from being connected to (and serviced by) a first node (e.g., a first access node or a first relay node), to being connected to (and serviced by) a second node (e.g., a second access node or a second relay node). The conditions for triggering the re-configuration of connections may include, for example, when a new base station or access node has been established near the wireless device, when a base station or access node has ceased to provide services (e.g., temporarily shut down due to power outage, maintenance, or permanently shut down), when the distribution of the base stations or access nodes has been changed. The conditions may also include when the wireless device moves from a coverage area of the first base station into, or adjacent a coverage area of a second base station that can provide better services (e.g., stronger signals) to the wireless device, or when the wireless device detects a poor quality of service provided by the first base station.

Each wireless device may store a preferred nodes list (e.g., list of access nodes, relay nodes), and the wireless device may connect to only the nodes included in the preferred nodes list. When the second base station or access node is not included in the preferred nodes list, the wireless device needs to obtain an updated preferred nodes list before the wireless device can connect to the second base station or access node. The preferred nodes list may be stored in the wireless device and a server in the wireless network, such as a Universal Seamless Handoff Architecture (USHA) server. In conventional wireless networks and systems, when there is a need to update the preferred nodes list, an operator or user of the server has to manually update the preferred nodes list. The operator then has to manually send the updated preferred nodes list to the wireless device, or manually send a message to wireless device to notify the wireless device that an updated preferred nodes list is available at the server. When the wireless network includes a large number of wireless devices, the operator has to manually process a large number of updated preferred nodes list for the wireless devices. Manually updating and sending the preferred nodes lists is time consuming and inefficient.

The present disclosure provides methods and systems that enable a wireless network to automatically update the preferred nodes lists for wireless devices. The automatic update may be achieved by detecting or receiving, by a server, a trigger indicating the need to update the preferred nodes list for a wireless device. In response to the trigger, the server may update the preferred nodes list for the wireless device and store the updated preferred nodes list at the server. The server may also instruct (e.g., by sending a message to) a first node, to which the wireless device is currently connected, to send a message to the wireless device to instruct the wireless device to contact the server for the updated preferred nodes list. When the wireless device contacts the server, e.g., by sending a request or message to the server, for the updated preferred nodes list, the server may provide the updated preferred nodes list to the wireless device.

The disclosed systems and methods may be implemented at different levels. For example, the disclosed systems and methods may be implemented for automatically updating preferred nodes list for end-user wireless devices that are directly connected to an access node without being relayed by a relay node. The preferred nodes in the preferred nodes list for the end-user wireless devices may include access nodes. As another example, the disclosed systems and methods may be implemented for automatically updating preferred nodes list for relay nodes that are connected to an access node. The preferred nodes in the preferred nodes list for the relay nodes may include access nodes. As a further example, the disclosed systems and methods may be implemented for automatically updating preferred nodes list for end-user wireless devices that are connected to the access node through relay nodes. The preferred nodes in the preferred nodes list for the end-user wireless devices may include relay nodes. In some embodiments, the preferred nodes list for an end-user wireless device may include both preferred relay nodes and preferred access nodes.

Various components in the wireless network may initiate a process for updating the preferred nodes list for the wireless device. For example, the server may initiate a process for updating the preferred nodes list. When the server detects a change in the configurations, settings, capabilities, or distribution of the access nodes, the server may determine that the connections between the wireless devices and the access nodes need to be re-configured. The server may instruct an access node to send a message to the wireless devices currently connected to the access node. The messages may instruct the wireless devices to contact the server to obtain an updated preferred nodes list for each wireless device.

In some embodiments, an access node may initiate a process for updating the preferred nodes list for a wireless device. For example, in one embodiment, the access node may detect that the quality of service provided to a wireless device (such as an end-user wireless device or a relay node) is below a predetermined quality level, the access node may request the server to re-allocate the communication resources, such as re-configuring the connections between the wireless devices and the access nodes included in the wireless network. In some embodiments, the access node may detect a high level of traffic congestion, and may request the server to divert some of the traffic within the coverage area of the access node to one or more other access nodes in the wireless network by re-configuring the connections between the wireless devices and the access nodes. Re-configuring the connections may include removing a first access node from a preferred nodes list and adding a second access node to the preferred nodes list, and connecting some of the wireless devices currently connected to the first access node to the second access node.

In some embodiments, a wireless device (e.g., an end-user wireless device or a relay node) may initiate a process for updating the preferred nodes list. For example, the wireless device may detect that a quality of service provided by an access node (or a relay node) is below a predetermined quality level. The wireless device may request the server to change its connection to another access node or relay node.

In some embodiments, the server may receive or detect a trigger, such as a request, a message, or a signal, from the wireless devices served by the access nodes (or relay nodes) or from the access nodes (or relay nodes). The trigger may indicate to the server that the communication resources need to be re-allocated such that the connections between the access nodes (or relay nodes) and the wireless devices are changed. For example, the trigger may include a message or request from an end-user wireless device requesting the server to change a connection between the end-user wireless device and the access node, such that the end-user wireless device can be connected to another access node. As another example, the trigger may include a message or request from an end-user wireless device requesting the server to change a connection between the end-user wireless device and a relay node, such that the end-user wireless device can be connected to another relay node. As a further example, the trigger may include a message or request from a relay node requesting the server to change a connection between the relay node and an access node, such that the relay node can be connected to another access node.

In some embodiments, the trigger may indicate that a quality of service provided by an access node to an end-user wireless device is below a predetermined quality level. In some embodiments, the trigger may indicate that a quality of service provided by an access node to a relay node is below a predetermined quality level. In some embodiments, the trigger may indicate that a quality of service provided by a relay node to an end-user wireless device is below a predetermined quality level. In some embodiments, the trigger may indicate a change in the conditions of the access node, such as a change in the capability of processing traffic, a change in the quality of service, a change in the location, a change in its coverage area, etc. In some embodiments, the trigger may indicate a change in the distribution of access nodes in the wireless network, such as shutdown of an access node, establishment of a new access node, relocation of an access node, etc. In some embodiments, the trigger may indicate a change in the conditions of a relay node, such as a change in the capability of processing traffic, a change in the quality of service, a change in the location, a change in its coverage area, etc.

The term "wireless device" refers to any wireless user equipment included in a wireless network. The term "wireless device" may include an end-user wireless device (e.g., a mobile phone or other mobile device), or a relay device (or relay node) that provide relay services to the end-user wireless device. The term "end-user wireless device" refers to end-user communication equipment, such as a mobile phone, which may be directly connected to an access node without being relayed by a relay node.

The term "node" refers to an access node, a relay node, or any other node that may provide communication services to a wireless device. The term "preferred nodes list" refers to a list of preferred nodes that provide communication services to a wireless device, such as preferred access nodes and/or preferred relay nodes. For example, when a wireless device is an end-user wireless device directly connected to an access node without being relayed by a relay node, the nodes included in the preferred nodes list may include preferred access nodes. When a wireless device is an end-user wireless device connected to the access node through a relay node, the nodes included in the preferred nodes list may include preferred relay nodes. When the wireless device is a relay node connected to an access node, the nodes included in the preferred nodes list may include preferred access nodes. When the wireless device is an end-user wireless device connected to an access node through a relay node, the nodes included in the preferred nodes list may include both preferred relay nodes and preferred access nodes.

The term "trigger" may include any condition, data, signal, message, request, determination, or analysis result, which may cause a server to make a determination that a preferred nodes list should be updated for a wireless device. For example, a trigger may be a message received from an end-user wireless device and/or a relay node indicating a quality of services provided by an access node is below a predetermined quality level. As another example, a trigger may be a detection by the server that a new access node is added to the network, which may require re-configuration of network connections (e.g., assigning some of the wireless devices currently connected to an access node to the new access node). A trigger may be a request or message received from an access node for re-allocation of network resources, including re-configuration of network connections between end-user wireless devices and access nodes, between end-user wireless devices and relay nodes, and/or between relay nodes and access nodes. Other examples the trigger include changes in operational conditions associated with relay nodes, access nodes, and/or end-user wireless devices, which are discussed below.

An exemplary system or wireless network described herein includes at least an access node, such as an eNodeB or a base station, and a plurality of end-user wireless devices wirelessly connected to the access node. The system may also include a relay node in wireless communication with the access node and configured to relay data packets between the access node and an end-user wireless device served by the relay node.

Relay nodes may improve communication service quality by relaying communication between the access node and one or more end-user wireless devices in the wireless network that are indirectly connected with the access node through the relay nodes. For example, relay nodes may be used at the edge of a coverage area of an access node to improve and/or extend coverage and service, as well as in crowded areas having a high number of end-user wireless devices to increase the available throughput to the end-user wireless devices being relayed by the relay nodes. When relay nodes are connected to an access node, the access node may be referred to as a "donor" access node or a donor cell. Relay nodes may be configured to communicate with the "donor" access node via a wireless backhaul connection or backhaul, and to deploy a radio air interface to which end-user wireless devices can attach. Donor access nodes may include scheduling modules or schedulers for scheduling or allocating resources to wireless devices directly connected thereto, as well as to the relay nodes connected to the donor access nodes through the wireless backhaul connection.

In some embodiments, a relay node may include a first component for communicating with the donor access node via a wireless backhaul connection and a second component for deploying a wireless air interface. End-user wireless devices can attach to the wireless air interface deployed by the relay node to access network services provided by the donor access node. For example, the first component may include a wireless device for communicating with the donor access node via the backhaul (hereinafter, the first component may be referred to as "relay wireless device" or "relay user equipment" or "Relay UE"). The second component may include a small-cell access node (hereinafter the second component may be referred to as "relay access point"), which may communicate with end-user wireless devices that rely on the relay node for communicating with the donor access node. Alternatively, the first and second components may be combined into a single relay node device.

In addition to the systems and methods described herein, the operations for automatically updating the preferred nodes list for a wireless device may be implemented as computer-readable instructions or methods, and processing nodes on the network for executing the instructions or methods. A processing node may be a processor included in the access node or may be a processor included in any controller node or server in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a first radio air interface serving one or more relay nodes 120 and 130, and one or more end-user wireless devices. One or more end-user wireless devices may be directly connected to access node 110, such as end-user wireless devices 140*a*, 140*b*, 140*c*, and 140*d*. One or more end-user wireless devices may be indirectly connected to access node 110 through relay nodes 120 and 130, such as end-user wireless devices 150 and 160. The end-user wireless devices and the relay nodes may be generally referred to as wireless devices. The relay nodes and the access node may be generally referred to as nodes. For example, relay node 120 is a node for end-user wireless devices 150, and access node 110 is a node for relay node 120 (which is also a wireless device).

In the exemplary embodiment shown in FIG. 1, access node 110 may be a macro-cell access node, such as a base station, and may be configured to deploy the first radio air interface over a coverage area 111. Each of relay nodes 120, 130, and each of end-user wireless devices 140*a*, 140*b*, 140c, and 140d may be attached to the first radio air interface deployed by access node 110. Relay nodes 120 and 130 may be configured to communicate with access node 110 over wireless communication links 125 and 135, respectively (hereinafter, "wireless backhaul" or "backhaul"). Relay nodes 120, 130 may be further configured to deploy additional wireless radio air interfaces (e.g., second and third radio air interfaces) over coverage areas 112 and 113, respectively. A plurality of end-user wireless devices 150 may be configured to attach to a wireless radio air interface or link 155 deployed by relay node 120, and a plurality of end-user wireless devices 160 may be configured to attach to a wireless air interface or link 165 deployed by relay node 130. All of the end-user wireless devices 150 and 160 are indirectly attached to the first radio air interface deployed by access node 110 through relay nodes 120 and 130.

In some embodiments, end-user wireless devices 150 and 160 may access network services using the combination of relay nodes 120 and 130, wireless backhaul links 125 and 135, and access node 110. In some embodiments, end-user wireless devices 140a, 140b, 140c, and 140d may access network services by directly connecting to access node 110. As shown in FIG. 1, end-user wireless devices 160 are illustrated as being located outside of coverage area 111 of access node 110. End-user wireless devices 160 may access network services provided by access node 110 through relay node 130. In this configuration, access node 110 may be referred to as a "donor" access node. In other embodiments, any other combination of donor access nodes, relay nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, or the like. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations such as those described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

End-user wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. End-user wireless devices 140a, 140b, 140c, and 140d may be directly communicating with access node 110 without using a relay node, whereas end-user wireless devices 150 and 160 may be indirectly communicating with access node using relay nodes 120 and 130. Each of end-user wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by end-user wireless devices 150 and 160. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5GNR, or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. In some embodiments, communication link 106 may include Si communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G New Radio (5G NR), and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140*a*, 140*b*, 140*c*, 140*d*, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein, including operations relating to dynamically selecting the number of transmitting ports in an antenna at access node 110. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
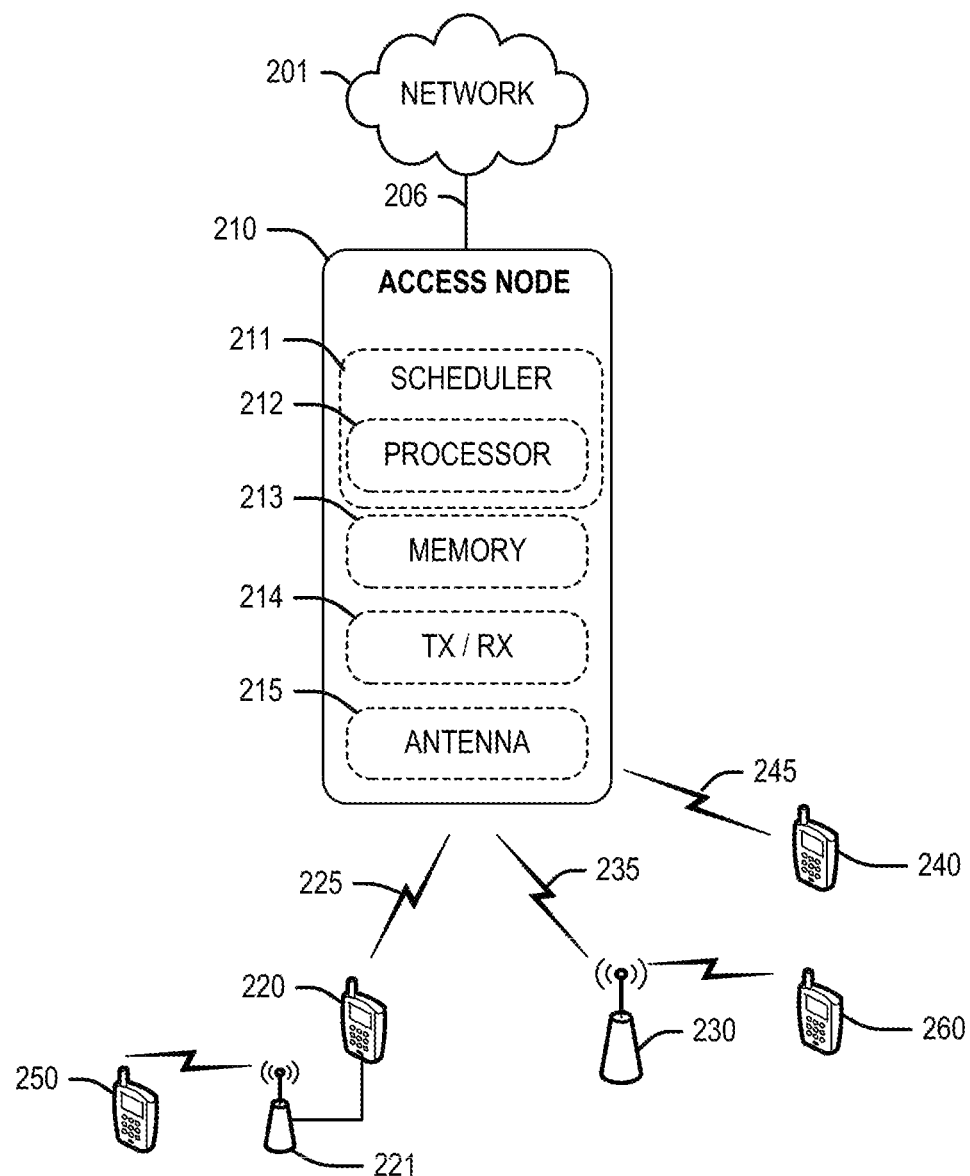
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including uplink and/or downlink resources, for relay nodes communicatively coupled to access node 210. In some embodiments, processor 212 of scheduler 211 may be configured to execute instructions stored on memory 213 for performing various methods disclosed herein. Transceiver 214 and antenna 215 may be configured to enable wireless communication with a relay wireless device 220, a relay node 230, and an end-user wireless device 240. Relay wireless device 220 may communicate with access node 210 through a wireless link 225. Relay node 230 may communicate with access node 210 through a wireless link 235. End-user wireless device 240 may communicate with access node 210 through a wireless link 240. Wireless links 225, 235, and 245 may form the wireless network (or wireless radio air interface) deployed by access node 210. Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210. Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler

211. Alternatively, scheduler 211 may include an additional memory. In some embodiments, access node 210 may be referred to as a donor access node.

Figure 3:
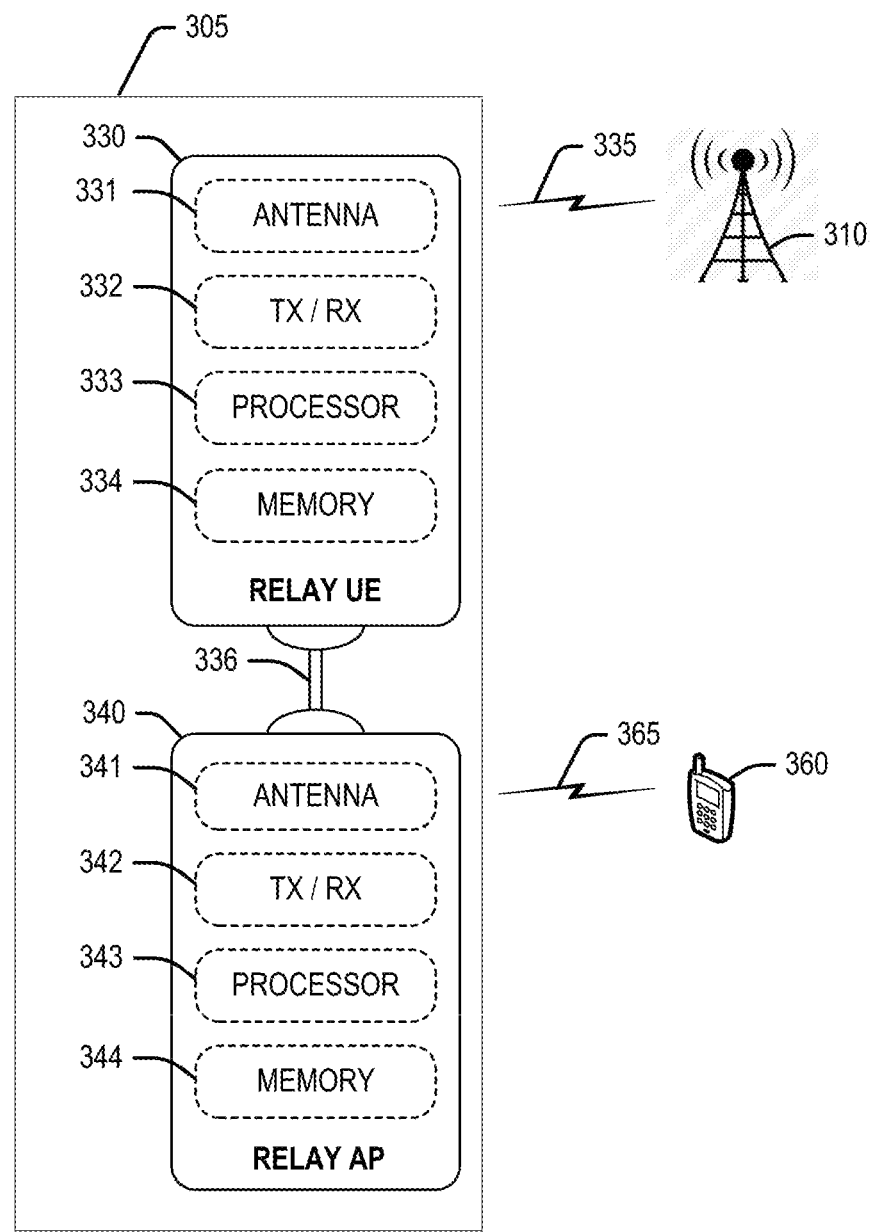
FIG. 3 depicts an exemplary relay node, in accordance with the disclosed embodiments.

FIG. 3 depicts an exemplary relay node 305 including a relay wireless device (relay user equipment or relay UE) 330 and a separate relay access point (relay AP) 340. Relay node 305 may be an embodiment of relay node 120 and/or 130. Relay wireless device 330 may include an antenna 331 for direct (i.e., unrelayed) communication with a donor access node 310 via a wireless backhaul link 335. Access node 310 may be an embodiment of access node 110 and/or access node 210. Relay wireless device 330 may also include a transceiver 332, a processor 333, and a memory 334 for storing instructions that enable relay wireless device 330 to perform operations described herein. In some embodiments, relay wireless device 330 may be referred to as a customer premise equipment (CPE), which may be a stationary LTE wireless device having a stronger computational & radio frequency capability versus standard wireless devices. Relay wireless device 330 may include a directional antenna and a dedicated power supply, enabling relay wireless device 330 to efficiently provide resources to wireless device 360 via relay access point 340 and a communication link 365. In some embodiments, relay access point 340 may be co-located with relay wireless device 330, and may be connected to relay wireless device 330 via a communication interface 336. In some embodiments, relay access point 340 and relay wireless device 330 may be included in a single device. Communication interface 336 may be a suitable interface that enables communication (e.g., direct communication) between relay wireless device 330 and relay access point 340, such as USB, FireWire, Ethernet, or any other serial, parallel, analog, or digital interface. In some embodiments, relay node 305 may be configured to perform functions similarly performed by an access node (e.g., access node 210). For example, in some embodiments, relay node 305 may include a scheduler configured to schedule resources for a plurality of wireless devices connected to relay node 305. As another example, processor 333 included in relay node 305 may perform various operations disclosed herein for automatically updating a preferred nodes list for a wireless device.

In operation, in some embodiments, relay wireless device 330 may be configured to relay network services from donor access node 310 to wireless device 360 via relay access point 340. Relay wireless device 330 may begin to function as a relay wireless device by sending a message to donor access node 310 to indicate that wireless device 330 is functioning as a relay wireless device. In some embodiments, relay wireless device 330 may request to send a buffer status report to donor access node 310. Donor access node 310 may grant this request. Relay wireless device 330 may respond to the grant by sending a short buffer status report. This short buffer status report may be associated with a logical channel group that indicates the buffer status report is communicating the status of relay wireless device 330 as a relay, and thus is not asking for additional resource allocations (as a conventional buffer status report would indicate). In other words, when relay wireless device 330 responds with a buffer status report for the special logical channel group, it means that the buffer status report is not actually reporting the status of a buffer. Rather, this buffer status report indicates that the wireless device is functioning as a relay. Once the status of relay wireless device 330 is established, relay wireless device 330 may instruct relay access point 340 to start accepting connection requests from one or more wireless devices such as wireless device 360.

Further, based on the indication of relay status, donor access node 310 may alter how relay wireless device 330 is treated. For example, relay wireless device 330 may be provided with preferential treatment because it is functioning as a relay. In some embodiments, a specific class indicator may be assigned to wireless backhaul link 335 between relay wireless device 330 and donor access node 310. The class indicator may be a QoS Class Identifier (QCI) that is different from other QCIs assigned to wireless devices that are directly connected to donor access node 310. In other embodiments, upon determining that a resource requirement or traffic type of wireless device 360 meets a threshold or other criteria, the class indicator of wireless backhaul link 335 may be adjusted to meet the resource requirement or provide an appropriate QoS for the traffic type.

Referring to FIG. 3, relay access point 340 is illustrated as having an antenna 341 and a transceiver 342 for enabling communication with wireless device 360, a processor 343, and a memory 344 for storing instructions that are executable by processor 343. In some embodiments, relay access point 340 may be a home eNodeB. Moreover, although only one transceiver is depicted in each of relay wireless device 330 and relay access point 340, additional transceivers may be incorporated in order to facilitate communication across communication interface 336 and other network elements. In operation, relay access point 340 may be configured to deploy a carrier by the combination of antenna 341 and transceiver 342, and enable end-user wireless device 360 to attach thereto.

Figure 4:
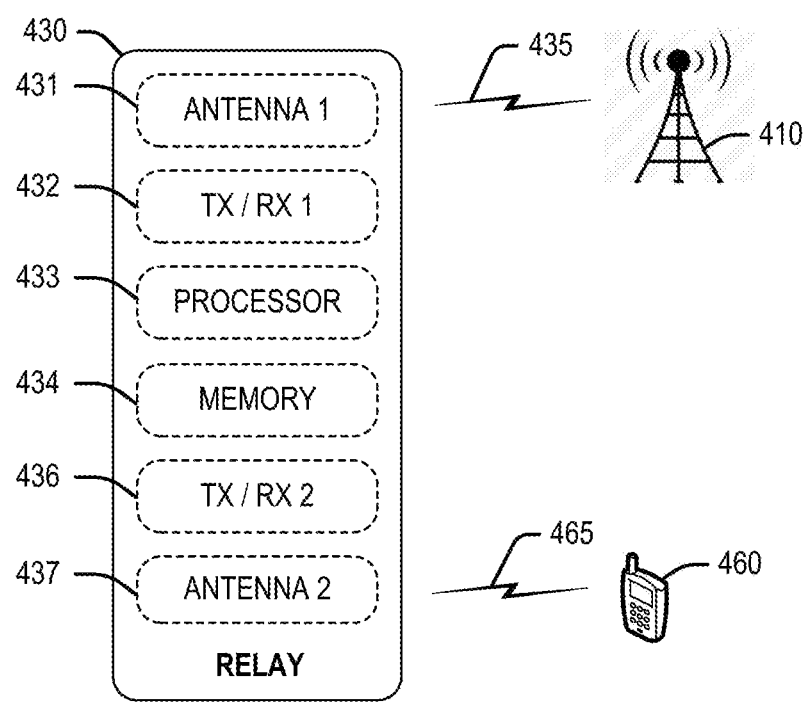
FIG. 4 depicts another exemplary relay node, in accordance with the disclosed embodiments.

In some embodiments, a relay node may integrate components of both a relay wireless device and a relay access point into a single unit. FIG. 4 depicts an exemplary relay node 430 according to this configuration. Relay node 430 may be an embodiment of relay node 120 and/or 130. Relay node 430 is illustrated as having a first antenna 431 for direct (i.e., unrelayed) communication with a donor access node 410 via a wireless backhaul link 435. Access node 410 may be an embodiment of access node 110, access node 210, and/or access node 310. Relay node 430 may include a first transceiver 432, a processor 433, and a memory 434 for storing instructions that are executable by processor 433 as described herein. Relay node 430 may further include a second transceiver 436 and a second antenna 437 for enabling communication with wireless device 460 via a wireless link 465. Relay node 430 may perform operations disclosed herein, including those described above with respect to FIG. 3. In some embodiments, relay node 430 may be configured to perform functions similarly performed by an access node. For example, relay node 430 may include a scheduler configured to schedule resources for a plurality of wireless devices connected to the relay node. As another example, processor 433 of relay node 430 may perform various operations disclosed herein for automatically updating a preferred nodes list for a wireless device.

In some embodiments, the relay nodes may be configured to function as one or more of a layer 1 (L1), layer 2 (L2), or layer 3 (L3) relay node. An L1 relay node functions as a booster or repeater. In other words, an L1 relay node performs an amplify and forward (AF) function. RF signals received from a donor access node are amplified and transmitted to end-user wireless devices by an L1 relay node. Likewise, RF signals received from end-user wireless devices are amplified and transmitted to donor access nodes by an L1 relay node. An L2 relay node performs a decode and forward (DF) function. RF signals received from a donor access node are demodulated and decoded, then encoded, modulated, and transmitted to a wireless device by an L2 relay node. Likewise, RF signals received from a wireless device are demodulated and decoded, then encoded, modulated, and transmitted to a donor access node by an L2 relay node. An L3 relay node performs a decode and forward function. An L3 relay node also performs additional processing, such as data ciphering, data concatenation, data segmentation, and/or data reassembly. In other words, a relay node depicted herein performs demodulation and decoding of the received RF signals (either uplink or downlink), processes received data, then encodes, modulates, and transmits the data between two communication devices. In some embodiments, a relay node may include functions that are similarly performed by an access node. For example, a relay node may include a scheduler that performs resource scheduling. The scheduler may include a processor (such as processor 333, 343, or 433) configured to perform the resource scheduling functions or operations disclosed herein.

Figure 5:
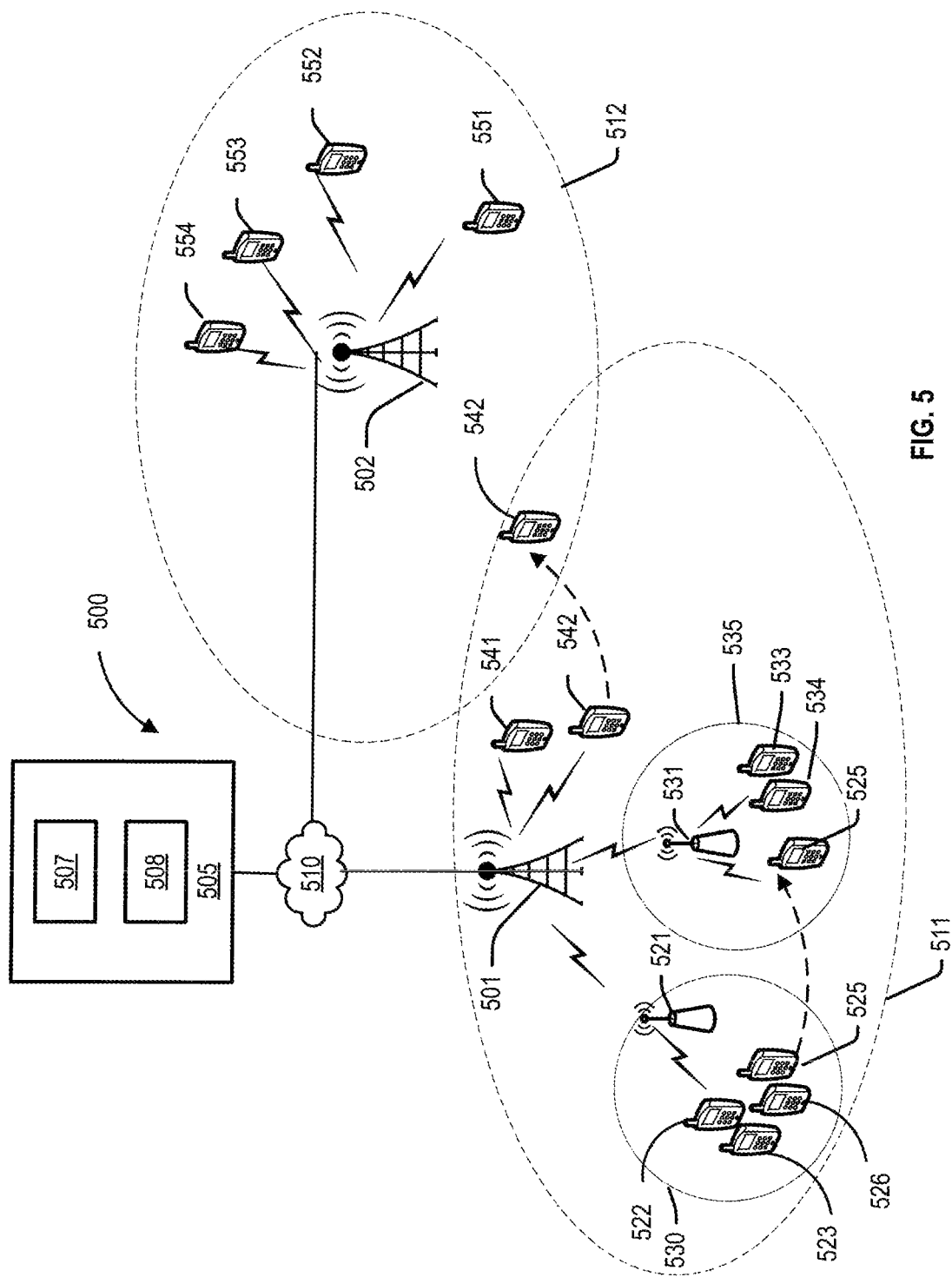
FIG. 5 depicts an exemplary system for wireless communication, in accordance with the disclosed embodiments.

FIG. 5 depicts an exemplary system 500 in which the disclosed systems and methods for updating preferred nodes lists for wireless devices may be implemented. System 500 may be a wireless network, such as a cellular network disclosed herein. System 500 may include a server 505 in communication with a plurality of access nodes 501, 502 via a communication network 510. In some embodiments, server 505 may be a Universal Seamless Handoff Architecture (USHA) server. Server 505 may be included in any device or entity that may be in communication with the access nodes 501, 502, such as, for example, controller node 104 shown in FIG. 1, or a Mobility Management Entity. In some embodiments, server 505 may be a standalone server in communication with access nodes 501, 502. Server 505 may include hardware and software components. For example, server 505 may include a processor 507 specially programmed to execute computer-executable codes or instructions stored in a memory 508 to perform various methods disclosed herein. Server 505 may also include other storage devices, displays, input/output devices, and/or communication interfaces configured to communicate with access nodes 501, 502 through network 510. Network 510 may be any of the wireless or wired networks disclosed herein. Access nodes 501, 502 may be embodiments of access nodes 110, 210, 310, and 410.

Server 505 may be configured to communicate with access nodes 501, 502, and may receive messages and/or requests from access nodes 501, 502. Server 505 may process the messages received from access nodes 501, 502 to obtain information regarding the operational status, such as traffic conditions, capability, signal strength, quality of service, etc., relating to access nodes 501, 502. Server 505 may be configured to send instructions (e.g., via messages of suitable format) to access nodes 501, 502. For example, server 505 may instruct one or more of access nodes 501, 502 to send a modified Radio Resource Control (RRC) Connection Reconfiguration message to one or more wireless devices within their respective coverage area, to instruct the one or more wireless devices to contact server 505 for an updated preferred nodes list. The modified RRC Connection Reconfiguration message may be configured to include an indicator (e.g., a data bit, a data field, a flag, etc.) to indicate to the one or more wireless devices that an updated preferred nodes list is available at server 505, and that the one or more wireless devices can contact server 505 to obtain a copy of the updated preferred nodes list.

Each of access nodes 501 and 502 may serve one or more end-user wireless devices, directly, or indirectly through a relay node. In the embodiment shown in FIG. 4, access node 501 is configured to deploy a radio air interface over a coverage area 511. Access node 501 may be configured to serve (e.g., provide wireless services to) a plurality of directly connected end-user wireless devices 541, 542, as well as a plurality of indirectly connected end-user wireless devices 522, 523, 525, 526, 533, and 534 through relay nodes 521 and 531. Relay nodes 521 and 531 may each be an embodiment of relay nodes 120, 130, 221, 230, 305, and/or 430. Relay node 521 may deploy a wireless radio air interface over a coverage area 530, and relay node 531 may deploy a wireless radio air interface over a coverage area 535.

Access node 502 may be configured to deploy a radio air interface over a coverage area 512. Access node 502 may serve a plurality of directly connected end-user wireless devices 551, 552, 553, and 554. Although not shown in FIG. 5, it is understood that access node 502 may also serve a plurality of end-user wireless devices through one or more relay nodes. Both of access nodes 501 and 502 may be connected to server 505 through network 510.

End-user wireless devices can move from one place to another. As the end-user wireless devices move, signal strength and quality of service relating to signals received by end-user wireless devices from access node (e.g., 501 or 502) may change due to various reasons. For example, when end-user wireless device 542 moves into an overlapping area between coverage area 511 and coverage area 512, signal strength and/or quality of service associated with communication between end-user wireless device 542 and access node 501 may degrade to below a predetermined signal strength and/or a predetermined quality level. End-user wireless device 542 may receive a better signal (e.g., at a stronger signal strength or at a higher quality of service) from access node 502. Thus, it may be desirable for an end-user wireless device to change its connection to the access node from connecting to access node 501 to connecting to access node 502.

In some embodiments, a detection (e.g., by end-user wireless device 542, by access node 501, or by server 505) of the signal strength and/or quality of service associated with the communication between end-user wireless device 542 and access node 501 degrading to a level below a predetermined signal strength and/or a predetermined quality level may constitute a trigger for initiating a process to update the preferred nodes list for end-user wireless device 542. In some embodiments, a message, signal, request, or demand received from the end-user wireless device 542 or access node 501 at server 505 indicating the degradation of signal strength and/or quality of service associated with the communication between end-user wireless device 542 and access node 501 to a level below a predetermined signal strength and/or a predetermined quality level may constitute a trigger for initiating a process to update the preferred nodes list for end-user wireless device 542.

In some embodiments, access node 501 may be overloaded and the traffic it handles may be highly congested. It may be desirable to divert some traffic from access node 501 to access node 502 by switching the connections of some wireless devices located within the overlapping area between coverage area 511 and coverage area 512 from connecting to access node 501 to connecting to access node 502. A detection of traffic congestion at access node 501 above a predetermined congestion level may constitute a trigger for initiating a process for updating the preferred nodes list of at least one wireless device (e.g., end-user wireless device 542 or relay node 521) connected to access node 501. In some embodiments, a message, signal, or request sent by access node 501 and received by server 505 indicating traffic congestion at access node 501 above a predetermined congestion level may constitute a trigger for initiating a process for updating the preferred nodes list of at least one wireless device (e.g., end-user wireless device 542 or relay node 521) connected to access node 501. In some embodiments, access node 501 may request server 505 to re-configure its connections with the wireless devices for other reasons. For example, when the configuration and/or setting at access node 501 have changed, which may have affected the traffic handling capacity of access node 501, access node 501 may request server 505 to re-configure its connections with some of the wireless devices.

In some embodiments, access node 501 may be temporarily shut down for repair or maintenance, or permanently shut down. It may be desirable to transfer some wireless devices (including end-user wireless devices and relay nodes) currently connected to access node 501 within coverage area 511 to access node 502. Server 505 may detect the shutdown of access node 501, and may automatically initiate a process for updating the preferred nodes list for the wireless devices connected to access node 501 by removing access node 501 from the list and adding access node 502 to the list, such that the wireless devices may be connected to access node 502. The detection of the shutdown of access node 501, by server 505, may constitute a trigger for initiating the process for updating the preferred nodes list for the wireless devices connected to access node 501. In some embodiments, access node 501 may notify server 505 (e.g., by sending a message, request, or signal to server 505) that access node 501 will be shut down, and hence request server 505 to transfer the wireless devices connected to access node 501 to access node 502. The notification (e.g., message, request, or signal) received from access node 501 may constitute a trigger for initiating the process for updating the preferred nodes list for the wireless devices connected to access node 501.

In some embodiments, a new access node (not shown) may be established or added to the wireless network or system 500, and it may be desirable to transfer some wireless devices from access nodes 501, 502 to the new access node. Server 505 may detect the establishment or addition of the new access node, and may initiate the process for updating the preferred nodes list for some of the wireless devices connected to access nodes 501, 502, such that these wireless devices may be connected to the new access node. The detection of the establishment of the new access node may constitute a trigger for initiate the process for updating the preferred nodes list for some of the wireless devices connected to access nodes 501, 502. In some embodiments, access nodes 501, 502 may detect the establishment of the new access node, for example, from an interference signal received from the new access node. Access nodes 501, 502 may send a message, request, or signal to server 505, requesting server 505 to re-allocate resources, including changing connections of some of the wireless devices currently connected to access nodes 501, 502 to the new access node. The message received by server 505 from access nodes 501, 502 may constitute a trigger for initiate the process of updating the preferred nodes list for the wireless devices.

In some embodiments, it may be desirable for an end-user wireless device to change its connection from connecting to a first relay node to connecting to a second relay node. For example, when end-user wireless device 525 moves from coverage area 530 of relay node 521 to coverage area 535 of relay node 531, end-user wireless device 525 may receive a weak signal from relay node 521 and a strong signal from relay node 531. Thus, it may be desirable to switch the connection of end-user wireless device 525 from connecting to relay node 521 to connecting to relay node 531, such that end-user wireless device 525 may receive stronger signals. In some embodiments, end-user wireless device 525 may send a request to server 505 (e.g., via relay node 531 and access node 501), requesting server 505 to change the relay node (e.g., relay node 521) to which end-user wireless device 525 is currently connected. The request received from end-user wireless device 525 by server 505 may constitute a trigger for initiating a process to update the preferred nodes list for end-user wireless device 525, which may include a list of preferred relay nodes and/or a preferred list of access nodes.

Although relay nodes 521, 531 may not move as frequently as end-user wireless devices, they may be moved from one place to another in certain circumstances. When relay nodes 521, 531 move, signal strength and/or quality of service for the communication between relay nodes 521, 531 and access node 501 may change, and may degrade to a level below a predetermined signal strength and/or below a predetermined quality level. Thus, it may be desirable to switch the connections for relay nodes 521, 531 from connecting to access node 501 to connecting to access node 502. In some embodiments, when relay nodes 521, 531 do not move, conditions associated with the access nodes to which relay nodes 521, 531 may be connected may change over time. For example, the conditions may include traffic conditions, capability of traffic handling, settings and configurations, distributions (e.g., geographical distributions), and/or operational status of access nodes, etc. As another example, conditions associated with relay nodes 521, 531 may change over time, such as the number of end-user wireless devices connected to relay nodes 521, 531, traffic conditions at relay nodes 521, 531, capability of traffic handling at relay nodes 521, 531, quality of services received from access node 501 at relay nodes 521, 531, etc. Various factors may contribute to a trigger for initiating a process to update the preferred nodes list for relay nodes 521, 531, such that the connections for relay nodes 521, 531 may be switched from connecting to access node 501 to connecting to another access node, such as access node 502 (if coverage area 512 can cover relay nodes 521 and 531).

Wireless devices, including end-user wireless devices and relay nodes, may each store a preferred nodes list locally. The preferred nodes list may also be stored at server 505. Any update to the preferred nodes list may be performed at server 505, and copies of the updated preferred nodes list may be obtained by the wireless devices from server 505. In some embodiments, a wireless device may connect to a node when the node is included in the preferred nodes list. Before the wireless device can connect to another node that is not included in the preferred nodes list, the preferred nodes list may be updated to include the other node. Server 505 may update the preferred nodes list in response to the trigger discussed herein.

Various devices or components included in system 500 may initiate the process to update the preferred nodes list. A wireless device may be an end-user wireless device or a relay node. The disclosed methods for updating the preferred nodes list for a wireless device may be implemented for updating a preferred relay nodes list for an end-user wireless device connected to a relay node, for updating a preferred access nodes list for an end-user wireless device connected to an access node without being relayed by a relay node, or for updating a preferred access nodes list for a relay node connected to an access node.

For example, an end-user wireless device may initiate the process to update the preferred nodes list, which may include preferred access nodes and/or preferred relay nodes. The end-user wireless device (e.g., 522, 523, 525, 526, 533, 534, 541, 542, 551, 552, 553, and 554) may detect a degradation in the quality of services it receives from an access node (and/or a relay node), and may send a message, request, or signal directly to server 505, or indirectly to server 505 through an access node and/or a rely node. The message from the end-user wireless device may request server 505 to re-allocate communication resources for the end-user wireless device, including, for example, re-configuring connections between the end-user wireless device and a relay node and/or an access node. The message may trigger server 505 to start a process for updating the preferred nodes list for the end-user wireless device. Server 505 may collect information from relay nodes and/or access nodes that may provide services to the end-user wireless device and determine which relay nodes and/or access nodes can be included in an updated preferred nodes list. The information collected from relay nodes and/or access nodes may indicate the traffic conditions, capability, and/or quality of services associated with the relay nodes and/or access nodes.

After determining which relay nodes and/or access nodes can be included in the updated preferred nodes list, server 505 may update the preferred nodes list stored at server 505 for a wireless device. Server 505 may instruct an access node and/or a relay node (e.g., access node 501 and/or relay node 521) to send a message to the end-user wireless device (e.g., end-user wireless device 541 and/or 522).

The message sent by the access node and/or the relay node to an end-user wireless device may be any suitable message for instructing the end-user wireless device to contact server 505 for the updated preferred nodes list. In some embodiments, the message may be a modified Radio Resource Control (RRC) Connection Reconfiguration message that contains an indicator instructing the wireless devices to contact the server for an updated preferred nodes list. For example, the modified RRC Connection Reconfiguration message may include a data bit, a data field, or a flag to indicate to the end-user wireless device that an updated preferred nodes list is available at server 505. In some embodiments, the data bit, data field, or flag may instruct the end-user wireless device to contact server 505 for an updated preferred nodes list. In some embodiments, the modified RRC Connection Reconfiguration message may also notify the end-user wireless device which new access node and/or relay node it can connect to. In some embodiments, the message may force or cause the end-user wireless device to contact server 505 to update its preferred nodes list. In some embodiments, the message may force or cause the end-user wireless device to immediately contact server 505 to update its preferred nodes list. In some embodiments, the message may force or cause the end-user wireless device to contact server 505 to update its preferred nodes list based on a criterion, such as within a predetermined time period (e.g., within 10 minutes, 30 minutes, 1 hour, 1 day, etc.), or after termination of a current communication session. In some embodiments, when the end-user wireless device does not contact server 505 within the predetermined time period, server 505 may repeat the operations, including instructing access node and/or relay node to which the end-user wireless device is connected to send a message to the end-user wireless device, thereby instructing, forcing, or causing the end-user wireless device to contact server 505 to obtain the updated preferred nodes list.

The end-user wireless device may contact server 505 and update its preferred nodes list, e.g., by obtaining the updated preferred nodes list from server 505 and storing it at the end-user wireless device. The end-user wireless device may then initiate a handover to change the access node and/or the relay node to which the end-user wireless device is connected. The end-user wireless device may select a new preferred node (access node and/or relay node) from the updated preferred nodes list and switch its connection from connecting to the current access node and/or relay node to connecting to the selected new preferred access node and/or relay node.

In some embodiments, a wireless device such as a relay node may initiate the process to update the preferred nodes list. For example, relay node 521 may be initially (currently) connected to access node 501. When conditions at access node 501 and/or relay node 521 change, for example, when the quality of services provided by access node to relay node 521 has degraded to a level below a predetermined quality level, relay node 521 may change the access node to which it is connected. For example, if relay node 521 is also located within the coverage area 512 of access node 502, relay node 521 may send a message to server 505 (either directly or indirectly through access node 501) requesting server 505 to re-allocate resources for relay node 521, including re-configuring the connection between relay node 521 and access node 501. The message may trigger server 505 to start a process for updating the preferred nodes list for relay node 521. Server 505 may collect information from relay nodes and/or access nodes included in the network and determine which access nodes should be included in the preferred nodes list for relay node 521. Server 505 may update the preferred nodes list with one or more new preferred access nodes for relay node 521.

Server 505 may instruct access node 501 to send a message to relay node 521. The message may be any suitable message that may instruct relay node 521 to contact server 505 for the updated preferred nodes list. In some embodiments, the message may be a modified Radio Resource Control (RRC) Connection Reconfiguration message that contains an indicator instructing relay node 521 to contact the server for an updated preferred nodes list. For example, the modified RRC Connection Reconfiguration message may include a data bit, a data field, or a flag to indicate to relay node 521 that an updated preferred nodes list is available at server 505. In some embodiments, the data bit, data field, or flag may instruct relay node 521 to contact server 505 for an updated preferred nodes list. In some embodiments, the modified RRC Connection Reconfiguration message may also notify relay node 521 which new access node it can connect to. In some embodiments, the data bit, data field, or flag included in the message may force or cause relay node 521 to contact server 505 to update its preferred nodes list. In some embodiments, the message may force or cause relay node 521 to immediately contact server 505 to update its preferred nodes list. In some embodiments, the message may force or cause relay node 521 to contact server 505 to update its preferred nodes list based on a criterion, such as within a predetermined time period (e.g., within 10 minutes, 30 minutes, 1 hour, 1 day, etc.), or after termination of a current communication session. In some embodiments, when relay node 521 does not contact server 505 within the predetermined time period, server 505 may repeat the operations, including instructing access node 501 to which relay node 521 is connected to send a message to relay node 521, where the message forces or causes relay node 521 to contact server 505 to obtain the updated preferred nodes list.

In some embodiments, an access node (e.g., access node 501, 502) may initiate the process of updating the preferred nodes list for a wireless device that is connected to the access node. The wireless device may be an end-user wireless device (e.g., 522, 523, 525, 526, 533, 534, 541, 542, 551, 552, 553, 554), or may be a relay node (e.g., 521, 531). For example, access node 501 may detect that a quality of services provided to one or more end-user wireless devices and/or relay nodes has degraded below a predetermined quality level, and may request server 505 to re-allocate resources, including changing access nodes to which the one or more end-user wireless devices and/or relay nodes may connect. As another example, access node 501 may detect that traffic handled by access node 501 is highly congested, and may request server 505 to re-allocate resources, including changing access nodes to which the one or more end-user wireless devices and/or relay nodes may connect. Changes in the conditions associated with access node 501 may have result in a reduced traffic handling capacity at access node 501. Access node 501 may request server 505 to re-allocate resources, including changing access nodes to which the one or more end-user wireless devices and/or relay nodes within coverage area 511 may connect. In some embodiments, access node 501 may detect a signal from a nearby access node (e.g., 502) that has a strength greater than a strength currently provided by access node 501 to one or more end-user wireless devices and/or relay nodes. Access node 501 may determine that the one or more end-user wireless devices and/or relay nodes may receive better services from the nearly access node, and therefore, may request server 505 to switch the connections of the one or more end-user wireless devices and/or relay nodes to the nearby access node.

After receiving the request from access node 501, server 505 may collect information from access nodes included in system 500, and may determine updates to preferred nodes lists for the one or more end-user wireless devices and/or relay nodes. The updates may include removing certain access nodes from the list, adding new access nodes to the list, or changing priorities (or order of preference) of the existing access nodes in the preferred nodes list. Server 505 may update the preferred nodes lists, and may instruct access node 501 to send a message to the one or more end-user wireless devices and/or relay nodes to contact server 505 for the updated preferred nodes lists. The message may be a modified RRC Connection Reconfiguration message disclosed herein. The one or more end-user wireless devices and/or relay nodes may contact server 505 and obtain updated preferred nodes lists. The one or more end-user wireless devices and/or relay nodes may store their respective updated preferred nodes lists locally, and may switch their connections to an access node from connecting to access node 501 to connecting to one of the access nodes included in the updated preferred nodes list.

In some embodiments, server 505 may initiate the process for updating a preferred nodes list for an end-user wireless device and/or a relay node. For example, server 505 may communicate with access nodes and/or other entities in the network, and may receive information regarding distributions, configurations, settings, current traffic, capacity, quality of services, etc., associated with the access nodes and/or relay nodes. Server 505 may analyze the information to determine or to optimize a configuration of the wireless network, including connections between end-user wireless devices and/or relay nodes and access nodes, and connections between end-user wireless devices and relay nodes. For example, based on the quality of services, the traffic condition, and the capacity associated with access nodes 501 and 502, server 505 may determine that one or more identified end-user wireless devices and/or relay nodes currently connected to access node 501 can connect to access node 502. Server 505 may automatically update preferred nodes list for the identified end-user wireless devices and/or relay nodes, and instruct access node 501 to send a message to the identified end-user wireless devices and/or relay nodes. The message may instruct the identified end-user wireless devices and/or relay nodes to contact server 505 to update their respective preferred nodes list. The identified end-user wireless devices and/or relay nodes may contact server 505 and update their respective preferred nodes list, and may connect to access node 502 included in the updated preferred nodes list.

In some embodiments, server 505 may periodically analyze information collected from access nodes, relay nodes, end-user wireless devices, and/or other network entities (e.g., Mobility Management Entity) to perform an optimization of the network configuration. For example, server 505 may monitor information of the network, such as the distribution of access nodes, relay nodes, end-user wireless devices, the capacities of access nodes and relay nodes, the current traffic conditions handled by each access node and/or relay node, etc. The monitoring of the network information may be performed continuously in real time, or may be performed periodically at a predetermined time interval (e.g., every 30 minutes, 1 hour, 2 hours, 1 day, etc.). In some embodiments, the monitoring of the network information may be performed in response to a trigger, such as a message or a request received from another network entity, such as an end-user wireless device, a relay node, an access node, etc. Server 505 may analyze data or information collected during the monitoring, and may perform an optimization of the network configuration. Optimization may be performed using any suitable algorithm, such as a neuro-network based optimization algorithm. When server 505 determines that the network connections need to be re-configured based on a result of the optimization, server 505 may adjust the network configuration by re-configuring the connections between the access nodes, the relay nodes, and the end-user wireless devices. To re-configure the connections, server 505 may update preferred nodes list for the relay nodes and/or end-user wireless devices. Server 505 may instruct the access nodes to send messages to one or more wireless devices connected to the access nodes, such as one or more relay nodes and/or end-user wireless devices. The messages may instruct the relay nodes and/or end-user wireless devices to contact server 505 for the updated preferred nodes list. The messages may be modified RRC Connection Reconfiguration messages disclosed herein. After contacting server 505 and obtaining their respective updated preferred nodes list, the end-user wireless devices and/or relay nodes may change their connections to the access nodes by connecting to new access nodes included in the updated preferred nodes list. In some embodiments, the end-user wireless devices may change their connections to the relay nodes by connecting to new relay nodes included in the updated preferred nodes list. The process of monitoring the network, optimizing the network configuration, updating preferred nodes lists, and re-connecting to nodes included in the updated preferred nodes lists may be repeatedly performed via various network components at a predetermined time interval.

Figure 6:
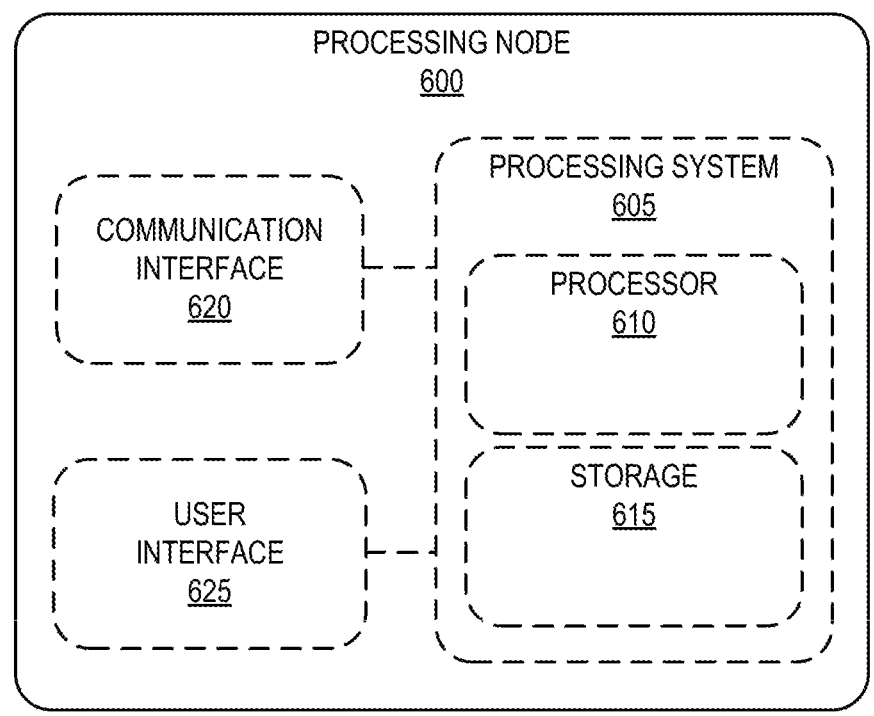
FIG. 6 depicts an exemplary processing node, in accordance with the disclosed embodiments.

FIG. 6 depicts an exemplary processing node 600, which may be configured to perform the methods and operations disclosed herein for automatically updating a preferred nodes list for a wireless device. In some embodiments, processing node 600 may be included in an access node, such as access node 110, 210, 310, 410, 501, and 502. In some embodiments, processing node 600 may be included in controller node 104. In some embodiments, processing node 600 may be included in server 505. For example, processing node 600 may include processor 507 and memory 508 depicted in FIG. 5.

Processing node 600 may be configured to determine, in response to a trigger discussed herein, that connections between access nodes and relay nodes, connections between relay nodes and end-user wireless devices, and/or connections between access nodes and end-user wireless devices need to be adjusted or re-configured. Processing node 600 may instruct an access node to send a message to one or more relay nodes and/or end-user wireless devices. The message may instruct the relay nodes and/or end-user wireless devices to contact server 505 for their respective updated preferred nodes list. The relay nodes and/or end-user wireless devices may contact server 505 and obtain a copy of the updated preferred nodes list, respectively.

Processing node 600 may include a processing system 605. Processing system 605 may include a processor 610 and a storage device 615. Storage device 615 may include a disk drive, a flash drive, a memory, or other storage device configured to store data and/or computer readable instructions or codes (e.g., software). The computer executable instructions or codes maybe accessed and executed by processor 610 to perform various methods disclosed herein. Software stored in storage device 615 may include computer programs, firmware, or other form of machine-readable instructions, including an operating system, utilities, drivers, network interfaces, applications, or other type of software. For example, software stored in storage device 615 may include a module for performing various operations described herein. Processor 610 may be a microprocessor and may include hardware circuitry and/or embedded codes configured to retrieve and execute software stored in storage device 615.

Processing node 600 may include a communication interface 620 and a user interface 625. Communication interface 620 may be configured to enable the processing system 605 to communicate with other components, nodes, or devices in the wireless network. Communication interface 620 may include hardware components, such as network communication ports, devices, routers, wires, antenna, transceivers, etc. User interface 625 may be configured to allow a user to provide input to processing node 600 and receive data or information from processing node 600. User interface 625 may include hardware components, such as touch screens, buttons, displays, speakers, etc. Processing node 600 may further include other components such as a power management unit, a control interface unit, etc.

Figure 7:
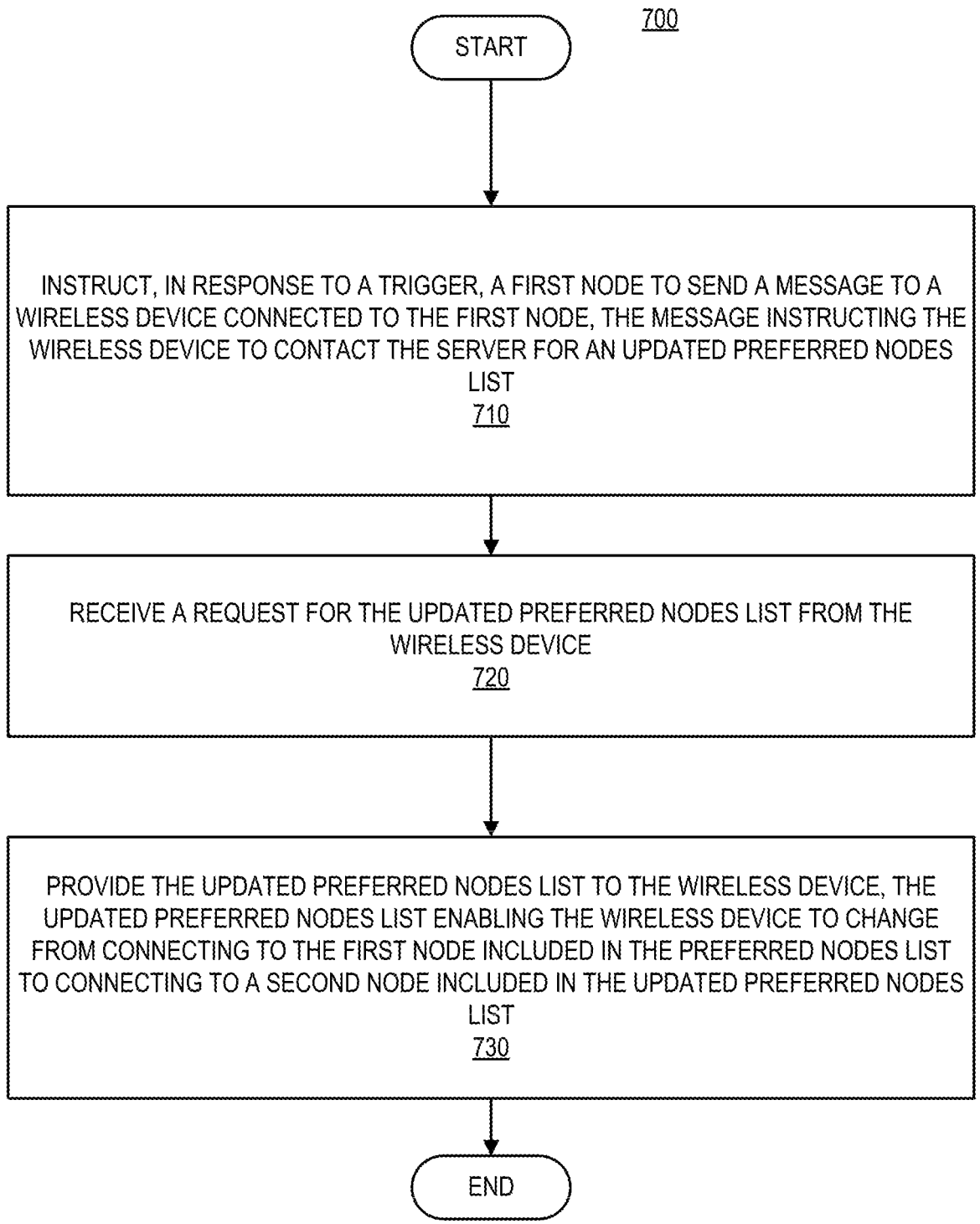
FIG. 7 depicts a flowchart illustrating an exemplary method for updating a preferred nodes list for a wireless device, in accordance with the disclosed embodiments.

FIG. 7 is a flowchart illustrating an exemplary method for automatically updating a preferred nodes list for a wireless device in a wireless network. Method 700 may be performed by any suitable processor discussed herein, for example, a processor included in an access node (e.g., access nodes 110, 210, 310, 410, 501, 502), a processor included in a relay node (e.g., relay nodes 120, 130, 221, 230, 305, 430, 521, 531), processor 610 included in processing node 600, processor 507 included in server 505, or a processor included in controller node 104. For discussion purposes, as an example, method 700 is described as being performed by processor 507 included in serer 505.

Method 700 may include instructing, in response to a trigger, a first node to send a message to a wireless device connected to the first node, the message instructing the wireless device to contact the server for an updated preferred nodes list (step 710). For example, processor 507 of server 505 may detect a trigger for initiating a process to update one or more preferred nodes lists for one or more wireless devices. The trigger may be changes in the conditions of the access nodes included in the wireless network. For example, the conditions changed may include a new access node having been added to the wireless network, an existing access node having been shut down, or settings and/or configurations of an existing access node having been changed such that traffic handling capacity of the existing access node having been affected.

In some embodiments, processor 507 of server 505 may determine a trigger based on a message, signal, and/or request received from one or more access nodes. For example, access node 501 may send a message to server 505 requesting server 505 to re-configure the connections between wireless devices included in the wireless network and access nodes included in the wireless network. The message may be the trigger. In some embodiments, server 505 may collect information regarding the quality of services provided by the access nodes included in the wireless network. By analyzing the collected information, server 505 may determine that a quality of services provided by an existing access node (e.g., access node 501) may have degraded below a predetermined quality level. The determination regarding the quality of services may be the trigger. In some embodiments, wireless devices may send signals, messages, and/or requests to server 505, requesting server 505 to change connections between the wireless devices and one or more relay nodes and/or access nodes to which the wireless devices are connected. The signals, messages, and/or requests received from the wireless devices may be triggers received by server 505. For example, end-user wireless device 542 may determine that access node 502 can provide better services than access node 501 (e.g., based on comparison of strengths of signals received from access nodes 501 and 502). End-user wireless device 542 may send a message to server 505, requesting server 505 to change an access node for end-user wireless device 542. As another example, end-user wireless device 525, which is currently connected to access node 501 through relay node 521, may send a message to server 505, requesting server 505 to change a relay node for end-user wireless device 525. As a further example, relay node 521, which is currently connected to access node 501, may send a message to server 505, requesting server 505 to change an access node for relay node 521. In some embodiments, access nodes (e.g., access nodes 501, 502) may send messages to server 505 requesting server 505 to re-allocate the network resources, including re-configuring the connections between the wireless devices (e.g., relay nodes and end-user wireless devices) and access nodes.

In response to the trigger, either determined by server 505 or received by server 505 from one or more relay nodes, access nodes, and/or end-user wireless devices, server 505 may update one or more preferred nodes lists for one or more wireless devices, which may be one or more relay nodes and/or end-user wireless devices. Server 505 may instruct an access node to send a message to a relay node and/or an end-user wireless device, to instruct the relay node and/or end-user wireless device to contact server 505 for the updated preferred nodes list. For example, when the trigger indicates that relay node 521 has requested server 505 to change an access node, server 505 may instruct access node 501, to which relay node 521 is currently connected, to send a message to relay node 521 instructing relay node 521 to contact server 505 for an updated preferred nodes list. As another example, when the trigger indicates that end-user wireless device 542 has requested server 505 to change an access node, server 505 may instruct access node 501 to send a message to end-user wireless device 542 to contact server 505 for an updated preferred nodes list. In some embodiments, an access node (e.g., access node 501) may request server 505 to change an access node for end-user wireless device 542. Server 505 may instruct access node 501 to send a message to end-user wireless device 542, instructing end-user wireless device 542 to contact server 505 for an updated preferred nodes list.

The message sent by the access nodes to relay nodes and/or end-user wireless devices may be a modified RRC Connection Reconfiguration message, which may include a data bit, data field, or flag to indicate to the relay nodes and/or end-user wireless devices that an updated preferred nodes list is available at server 505. In some embodiments, the data bit, data field, or flag may force the relay nodes and/or end-user wireless devices to contact server 505 for an updated preferred nodes list. In some embodiments, the data bit, data field, or flag may instruct or cause the relay nodes and/or end-user wireless devices to contact server 505 for an updated preferred nodes list.

Referring to FIG. 7, server 505 may receive a request for the preferred nodes list from a wireless device (step 720). For example, when the wireless device (e.g., relay node or end-user wireless device) receives the modified RRC Connection Reconfiguration message, the wireless device may contact server 505, and request for the updated preferred nodes list.

Server 505 may provide the updated preferred nodes list to the wireless device, the updated preferred nodes list enabling the wireless device to change from connecting to a first node included in the preferred nodes list to connecting to a second node included in the updated preferred nodes list (step 730). For example, after receiving the request for the updated preferred nodes list from end-user wireless device 542, server 505 may provide a copy of the updated preferred nodes list to end-user wireless device 542, or allow end-user wireless device 542 to access the updated preferred nodes list stored at server 505. End-user wireless device 542 may update a local copy of the preferred nodes list stored at end-user wireless device 542 with the updated preferred nodes list obtained from server 505. End-user wireless device 542 may then select a new access node (other than access node 501 to which end-user wireless device 542 is currently connected) from the updated preferred nodes list, and initiate a process for connecting to the new access node.

As another example, after receiving the request for the updated preferred nodes list from relay node 521, server 505 may provide a copy of the updated preferred nodes list to relay node 521, or allow relay node 521 to access the updated preferred nodes list stored at server 505. Relay node 521 may update a local copy of the preferred nodes list stored at relay node 521 with the updated preferred nodes list obtained from server 505. Relay node 521 may select a new access node (other than access node 501 to which relay node 521 is currently connected) from the updated preferred nodes list, and initiate a process for connecting to the new access node.

As a further example, after receiving the request for the updated preferred nodes list from end-user wireless device 525, server 505 may provide a copy of the updated preferred nodes list that may include preferred relay nodes for end-user wireless device 525, to end-user wireless device 525, or may allow end-user wireless device 525 to access the updated preferred nodes list. End-user wireless device 525 may update a local copy of the preferred nodes list stored at end-user wireless device 525 with the updated preferred nodes list obtained from server 505. End-user wireless device 525 may select a new relay node (other than relay node 521 to which end-user wireless device 525 is currently connected) from the preferred nodes list, and initiate a process for connecting to the new relay node.

Method 700 may include other operations not expressly listed in the flowchart in FIG. 7. For example, as discussed above, method 700 may include determining or detecting, by a processor, a trigger for initiating a process for updating the preferred nodes list for a wireless device, based on a message, signal, and/or request received from at least one of an access node, a relay node, and an end-user wireless device. Method 700 may include receiving, by the processor, the trigger from at least one of an access node, a relay node, and an end-user wireless device. Method 700 may include updating the preferred nodes list based on data or information collected from access nodes, relay nodes, and/or end-user wireless devices included in the wireless network. Updating the preferred nodes list may include determining which relay nodes and/or access nodes are to be included in the preferred nodes list.

In some embodiments, the trigger may include detection, by server 505, of changes in the nodes (e.g., access nodes, relay nodes, etc.) included in the wireless network. The changes in the nodes may include any changes to the nodes that may affect the traffic handling capabilities of the nodes. For example, the changes in the locations of access nodes and/or relay nodes, the operations status (temporary or permanent shutdown, new establishment) of access nodes and/or relay nodes, upgrading of hardware and/or software at an access node and/or a relay node, etc. In some embodiments, the trigger may include a message received by server 505 from the wireless device indicating that a quality of services provided by the first node (e.g., an access node or a relay node) to the wireless device is below a predetermined quality level. In some embodiments, the trigger may include a message received by server 505 from the first node indicating that a quality of services provided by the first node to the wireless device is below a predetermined quality level.

In some embodiments, the trigger may include a request received by server 505 from the first node for changing an access node and/or a relay node for the wireless device. In some embodiments, the nodes including the first node and the second node are access nodes, and the wireless devices include relay nodes connected to the access nodes through a backhaul, and the relay nodes serve a plurality of end-user wireless devices. In some embodiments, the nodes including the first node and the second node are relay nodes, and the wireless devices include end-user wireless devices connected to an access node through the relay nodes. In some embodiments, the nodes including the first node and the second node are access nodes, and the wireless devices include end-user wireless devices directly connected to the access nodes without being relayed by a relay node. In some embodiments, the message sent from the access node to the wireless devices (e.g., a relay node or end-user wireless device) includes a Radio Resource Control (RRC) Connection Reconfiguration message that contains an indicator instructing the wireless device to contact the server for an updated preferred nodes list.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for updating a preferred nodes list for a wireless device in a wireless network, the system comprising:
    a server in communication with a plurality of nodes each configured to deploy a radio air interface to provide wireless services to a plurality of wireless devices, the server comprising a processor configured to:
    update the preferred nodes list for the wireless device in response to a trigger when access conditions of a first node of the plurality of nodes satisfy predetermined requirements;
    send instructions to the first node of the plurality of nodes to send a connection reconfiguration message to the wireless device when the access conditions satisfy the predetermined requirements;
    receive a request for an updated preferred nodes list from the wireless device in response to the connection reconfiguration message; and
    provide the updated preferred nodes list to the wireless device, the updated preferred nodes list enabling the wireless device to change from connecting to the first node included in the preferred nodes list to connecting to a second node included in the updated preferred nodes list.

2. The system of claim 1, wherein the trigger comprises detection, by the server, of changes in at least one of the plurality of nodes.

3. The system of claim 1, wherein the trigger comprises a message received by the server from the wireless device indicating that a quality of services provided by the first node to the wireless device is below a predetermined quality level.

4. The system of claim 1, wherein the trigger comprises a message received by the server from the first node indicating that a quality of services provided by the first node to the wireless device is below a predetermined quality level.

5. The system of claim 1, wherein the trigger comprises a request received by the server from the first node for handover of the wireless device to the second node.

6. The system of claim 1, wherein the plurality of nodes including the first node and the second node are access nodes, the plurality of wireless devices comprise relay nodes connected to the access nodes through a backhaul, and the relay nodes serve a plurality of end-user wireless devices.

7. The system of claim 1, wherein the plurality of nodes including the first node and the second node are relay nodes, and the plurality of wireless devices comprise end-user wireless devices connected to an access node through the relay nodes.

8. The system of claim 1, wherein the plurality of nodes including the first node and the second node are access nodes, and the plurality of wireless devices comprise end-user wireless devices directly connected to the access nodes without being relayed by a relay node.

9. The system of claim 1, wherein the connection reconfiguration message is a Radio Resource Control (RRC) Connection Reconfiguration message that contains an indicator instructing the wireless device to contact the server for the updated preferred nodes list.

10. A method for providing an updated preferred nodes list for a wireless device in a wireless network including a plurality of nodes, the method comprising:
    detecting, by a processor, a trigger when access conditions of a first node of the plurality of nodes satisfy predetermined requirements and updating a preferred nodes list;
    sending instructions, by the processor, to the first node of the plurality of nodes to send a connection reconfiguration message to the wireless device when the access conditions satisfy the predetermined requirements;
    receiving, by the processor, a request for the updated preferred nodes list from the wireless device in response to the connection reconfiguration message; and
    providing, by the processor, the updated preferred nodes list to the wireless device, the updated preferred nodes list enabling the wireless device to change from connecting to the first node included in the preferred nodes list to connecting to a second node included in the updated preferred nodes list.

11. The method of claim 10, wherein the trigger comprises detection, by a server of the wireless network, of changes in at least one the plurality of nodes.

12. The method of claim 10, wherein the trigger comprises a message received by a server of the wireless network from the wireless device indicating that a quality of services provided by the first node to the wireless device is below a predetermined quality level.

13. The method of claim 10, wherein the trigger comprises a message received by a server of the wireless network from the first node indicating that a quality of services provided by the first node to the wireless device is below a predetermined quality level.

14. The method of claim 10, wherein the trigger comprises a request received by a server of the wireless network from the first node for handover of the wireless device to the second node.

15. The method of claim 10, wherein the plurality of nodes including the first node and the second node are access nodes, a plurality of wireless devices of the wireless network comprise relay nodes connected to the access nodes through a backhaul, and the relay nodes serve a plurality of end-user wireless devices.

16. The method of claim 10, wherein the plurality of nodes including the first node and the second node are relay nodes, and a plurality of wireless devices of the wireless network comprise end-user wireless devices connected to an access node through the relay nodes.

17. The method of claim 10, wherein the plurality of nodes including the first node and the second node are access nodes, and a plurality of wireless devices of the wireless network comprise end-user wireless devices directly connected to the access nodes without being relayed by a relay node.

18. The method of claim 10, wherein the connection reconfiguration message is a Radio Resource Control Connection Reconfiguration message that contains an indicator instructing the wireless device to contact a server of the wireless network for the updated preferred nodes list.

19. A processing node for providing an updated preferred nodes list for a wireless device in a wireless network including a plurality of nodes, the processing node being configured to perform operations comprising:
  updating, by a processor of the processing node, a preferred nodes list for the wireless device in response to a trigger when access conditions of a first node of the plurality of nodes satisfy predetermined requirements;
  sending instructions, by the processor, to the first node of the plurality of nodes to send a connection reconfiguration message to the wireless device when the access conditions satisfy the predetermined requirements;
  receiving, by the processor, a request for the updated preferred nodes list from the wireless device in response to the connection reconfiguration message; and
  providing, by the processor, the updated preferred nodes list to the wireless device, the updated preferred nodes list enabling the wireless device to change from connecting to the first node included in the preferred nodes list to connecting to a second node included in the updated preferred nodes list.

20. The processing node of claim 19, wherein the connection reconfiguration message is a Radio Resource Control (RRC) Connection Reconfiguration message that contains an indicator instructing the wireless device to contact a server of the wireless network for the updated preferred nodes list.

\* \* \* \* \*